United States Patent
Salahshour et al.

(10) Patent No.: US 9,101,871 B2
(45) Date of Patent: Aug. 11, 2015

(54) FILTER SYSTEMS

(75) Inventors: Abdolreza Salahshour, Raleigh, NC (US); Nagarjuna R. Vemireddy, Charlotte, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 272 days.

(21) Appl. No.: 13/452,098

(22) Filed: Apr. 20, 2012

(65) Prior Publication Data
US 2013/0276629 A1  Oct. 24, 2013

(51) Int. Cl.
*B01D 46/42* (2006.01)
*B01D 46/44* (2006.01)
*B01D 46/00* (2006.01)

(52) U.S. Cl.
CPC .......... *B01D 46/446* (2013.01); *B01D 46/0086* (2013.01)

(58) Field of Classification Search
CPC ....... B01D 46/86; B01D 46/446; B01D 46/42
USPC ............. 96/25, 400, 401, 419–420, 417, 421, 96/429; 55/471–472, 385.1; 95/19, 25
See application file for complete search history.

(56) References Cited

U.S. PATENT DOCUMENTS

| | | | |
|---|---|---|---|
| 4,522,028 A | | 6/1985 | Hasegawa et al. |
| 4,786,295 A * | | 11/1988 | Newman et al. ................ 96/400 |
| 5,141,309 A | | 8/1992 | Wörwag |
| 5,996,422 A | | 12/1999 | Buck et al. |
| 6,412,435 B1 | | 7/2002 | Timmons, Jr. |
| 7,040,154 B2 | | 5/2006 | Shaw et al. |
| 7,303,613 B2 | | 12/2007 | Rosenzweig |
| 7,418,763 B2 | | 9/2008 | Shaver et al. |
| 2006/0070527 A1* | | 4/2006 | Chapman et al. ............... 96/417 |
| 2007/0079589 A1* | | 4/2007 | Ekstrom et al. .............. 55/385.1 |
| 2007/0272082 A1* | | 11/2007 | Johansson ....................... 96/417 |
| 2008/0198896 A1* | | 8/2008 | Nair ............................. 374/141 |
| 2010/0313748 A1 | | 12/2010 | Schluter |

FOREIGN PATENT DOCUMENTS

DE  19720577 A1  11/1998
JP  2004097593 A  4/2004

OTHER PUBLICATIONS

"A Nano Pressure Sensor", Technology Review, Published by MIT, Mar. 6, 2007, link: http://www.technologyreview.com/Nanotech/18266/, 3 pages.

(Continued)

*Primary Examiner* — Jason M Greene
*Assistant Examiner* — Karla Hawkins
(74) *Attorney, Agent, or Firm* — John Pivnichny; Roberts Mlotkowski Safran & Cole, P.C.

(57) ABSTRACT

Systems and methods for monitoring quality of filters within a filtering system are disclosed. The system includes at least one pressure sensor which monitors a force applied by a filter on a filter housing. The system further includes a control system which provides notification to a user when the force measured by the at least one pressure sensor exceeds a predetermined threshold value.

21 Claims, 2 Drawing Sheets

(56) References Cited

OTHER PUBLICATIONS

"Visual Filter Indicator", link: http://www.timestrip.com/visual_filter_indicator.php, accessed Apr. 18, 2012, 2 pages.

Kyoungchul Kong et al., "A Gait Monitoring System based on Air |Pressure Sensors Embedded in a Shoe", IEEEASME Transactions on Mechatronics, Jan. 2009, vol. 14, Issue 3, (Abstract only attached).

\* cited by examiner

FILTER SYSTEMS

FIELD OF THE INVENTION

The invention relates to filter systems and, more particularly, to methods and systems for monitoring quality of filters within a filtering system.

BACKGROUND

Air filters are used in applications where air quality is important notably in building ventilation systems and in engines, as some examples. In traditional buildings, for example, a particulate air filter composed of fibrous materials is provided to remove solid particulates such as dust, pollen, mold, and bacteria from the air. A chemical air filter, on the other hand, consists of an absorbent or catalyst for the removal of airborne molecular contaminants such as volatile organic compounds or ozone.

Clean filters facilitate airflow, comfort and safety. Depending upon the type of filter installed, they normally are checked on a regular basis, e.g., monthly, as part of a preventive maintenance plan. These checks can even be more regular during heavy use periods. Of course, effectively working air filters collect dirt, dust, debris, and/or other particulate matter over time, which may eventually degrade the quality of the entire system such as, for example, restrict airflow.

Restricted airflow can have negative consequences such as, for example, strain the entire airflow system. That is, restricted airflow may impair the operations of the system by not allowing the system to reach desired operation levels, leading to lower efficiency and quicker degradation. This, in turn, may lead to higher power consumption, to meet the desired needs of the system. In addition, an unintended consequence of restricted airflow may be that incoming airflow may bypass the clogged filter, carrying dirt into the system potentially causing other undesirable consequences.

Accordingly, there exists a need in the art to overcome the deficiencies and limitations described hereinabove.

BRIEF SUMMARY

In an aspect of the invention, a system comprises at least one pressure sensor which monitors a force applied by a filter on a filter housing. The system further comprises a control system which provides notification to a user when the force measured by the at least one pressure sensor exceeds a predetermined threshold value.

In an aspect of the invention, a system comprises at least two piezoelectric pressure sensors mounted between a filter and a filter housing. The at least two piezoelectric pressure sensors sense an increased force applied by the filter on the filter housing during use. The system further comprises a control system connected to the at least two piezoelectric pressure sensors. The control system: determines a calculated reading of the at least two piezoelectric pressure sensors; correlates the calculated reading to a predetermined value, and provides a notification to a user when the correlated calculated reading is above the predetermined value.

In an aspect of the invention, a method of measuring a condition of a filter comprises: measuring a force applied by a filter on a filter housing; correlating the measured force with a condition of a filter; and providing a notification to a user that the condition of the filter includes a blockage, when the measured force is above a threshold value.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
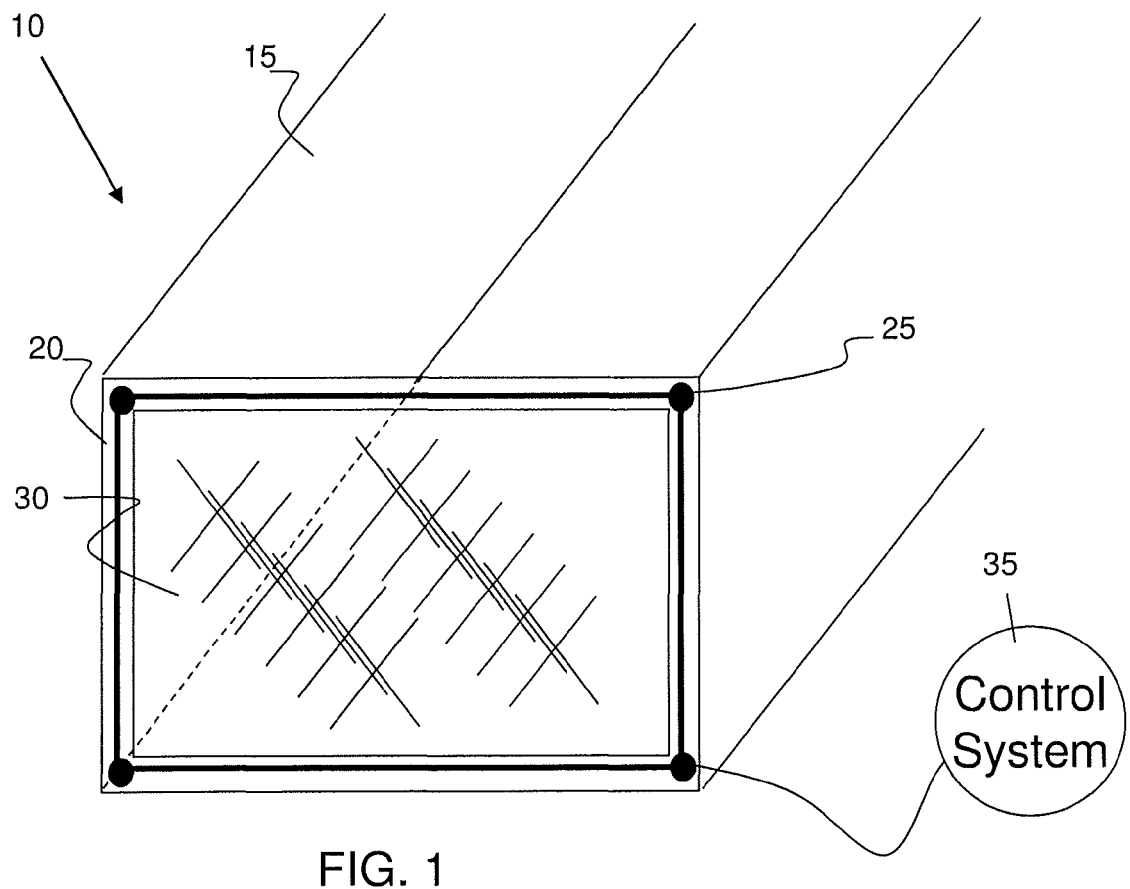
FIG. 1 shows an implementation of a filter system in accordance with aspects of the present invention.

The invention relates to filter systems and, more particularly, to methods and systems for monitoring the quality of filters within a filtering system. More specifically, in use, the methods and systems of the present invention implement one or more force measuring devices to measure a force (pressure) applied by the filter on a housing (e.g., frame of an air duct) in order to calculate or measure a level of blockage or obstruction of the filter due to contaminants, e.g., dirt, dust, debris and/or or other particulate matter. The methods and systems of the present invention can notify a user that the filter requires attention, e.g., replacement and/or cleaning, using many different methodologies. For example, the notification can be a visual indicator at the location of the filter or by the filtering unit itself, which will receive and monitor the signals from one or more measuring devices. The notification to the user can also be an auditory alert (e.g., buzzer, alarm, etc.). In embodiments, the notification can be provided to a mobile device, for example.

In embodiments, the force measuring devices can be mounted on the filter housing or the filter, itself, and can indicate to the user when to replace or clean the filter. In specific embodiments, the force measuring devices can indicate that cleaning and/or replacement of the filter is required by measuring the pressure applied by the filter on the housing, and comparing this pressure to a known initial pressure, e.g., using a new, clean filter. When the measured pressure is above a certain threshold, the methods and systems of the present invention notify the user that a new filter or a cleaning of the current filter is required. The increased force is indicative of restricted airflow and, hence, a blockage or obstruction of the filter due to contaminants, e.g., dirt, dust, debris and/or or other particulate matter. The methods and systems of the present invention can notify a user that the filter requires attention, e.g., replacement and/or cleaning, using many different methodologies. In embodiments, the one or more force measuring devices can be a piezoelectric pressure sensor.

Advantageously, the present invention provides a direct measurement of force (pressure) applied on the filter housing which, in turn, provides an accurate assessment of the state of the filter. That is, the increased force is indicative of restricted airflow and, hence, a blockage or obstruction of the filter. This is compared to air pressure sensors which do not provide a direct measurement; instead, they require two measurements upstream and downstream of the filter. Accordingly, by implementing the present invention there is no need to (i) calculate the difference in air pressure inside a duct with that of atmospheric air pressure, or (ii) calculate the difference in the air pressure of the inlet to the duct with that of outlet from the duct, or (iii) calculate the rate of air flow through the air duct, all of which require expensive and multiple air pressure sensors. It is noted that the use of air pressure sensors are not only expensive, but they may also be unreliable in that the same matter that is captured in the filter, can also clog or block the air pressure sensors. Thus, the present invention not only reduces overall system costs, it is more reliable than the use of conventional air pressure sensors.

Moreover, the present invention can be used in a host of different applications, which cannot be used with air pressure sensors. For example, the systems and methods of the present invention can be used in server rack applications. Additional implementations and uses can be used in cooling units, HVAC units, automobile air filter units (such as for engine, air conditioner, etc.), vacuum cleaners, water filtration systems, chemical related filtering systems, etc.

FIG. 1 shows an implementation of a filter system in accordance with aspects of the present invention. Specifically, FIG. 1 shows a system 10, which can be an air duct for an HVAC unit. It should be understood, though, that system 10 can also be representative of other systems such as, for example, cooling units for servers, automobile air filters, engine filters, vacuum cleaners, chemical filters, solid filters (which separate solid materials, e.g., sand sieve) or a host of other filters. Thus, it should be understood by those of skill in the art that the present invention is contemplated for use by air filter systems, as well as other types of filtering systems, e.g., water filters, particulate matter filters, etc.

Referring still to FIG. 1, the system 10 includes a frame 15. In embodiments, the frame 15 can be any duct, e.g., air duct; although, in embodiments, other frames are also contemplated by the present invention. In embodiments, the frame 15 can be of any type of appropriate construction, depending on its use. For example, the frame 15 can be aluminum, plastic, etc. The frame 15 includes a rim or other support member (housing) 20 configured for mounting and/or supporting of one or more force measuring devices 25 and a filter 30. In embodiments, the one or more force measuring devices 25 can be positioned between the filter and different locations on the support member 20. In this way, the one or more force measuring devices 25 can measure a force applied by the filter 30 on the support member 30, at different locations. As should be understood, this force will increase as the filter becomes blocked, due to the restricted air pressure against the filter 30.

Although the one or more force measuring devices 25 are shown at the respective corners of the support member 20, it should be understood by those of skill in the art that the one or more measuring devices 25 can be provided at other locations such as, the side edges, etc. Additionally, although four force measuring devices 25 are shown, it should also be understood by those of ordinary skill in the art that more or less than four force measuring devices 25 are contemplated by the present invention, depending on the size and type of filter and/or filtration sensor, and/or desired sensitivity, for example.

In embodiments, the one or more force measuring devices 25 can be a piezoelectric pressure sensor 25, i.e., piezoelectric dynamic force sensor, positioned between the support member 20 and the filter 30. The piezoelectric pressure sensor 25 can be composed of, for example, lead zirconate titanate crystals which generate measurable piezoelectricity when their static structure is deformed by about 0.1% of the original dimension. In use, the deformation can be provided by a force of the filter against the one or more measuring devices 25, which will increase as the filter 30 becomes blocked by dust, dirt, debris and/or other particulate matter. In further embodiments, the piezoelectric pressure sensor 25 can be a quartz crystal microbalance, which is capable of measuring mass deposition down to about 0.1 nanograms. Advantageously, the sensitivity of the microbalance can be lessened by placing the fulcrum closer to the middle thereof.

In implementations, the piezoelectric pressure sensor 25 is highly sensitive to an applied force/pressure provided from the filter 30, as it presses against the support member 20. In use, the piezoelectric pressure sensors 25 will frequently take measurements of the force applied by the filter 30 on the housing (support member) 20, at predetermined time basis or on a continuous time basis. The measurements taken from the piezoelectric pressure sensors 25 can be compared to a threshold value, e.g., exceeding a certain force. When the threshold value is exceeded, the systems and methods of the present invention can then notify the user that the filter requires attention, e.g., replacement, cleaning, etc. That is, the threshold value is indicative of restricted airflow and, hence, a blockage or obstruction of the filter due to contaminants. As should be understood by those of ordinary skill in the art, the threshold value can be changed (configured) to any level as needed, in case the piezoelectric pressure sensors 25 are used in different types of application/air duct, and/or different configurations, etc.

The methods and systems of the present invention can notify a user that the filter requires attention, e.g., replacement and/or cleaning, using many different methodologies. The notification can be provided by a control system (e.g., alarm) 35, as described in further detail below. For example, this notification can be a visual notification or an auditory signal (e.g., alarm).

In embodiments, an average reading of the piezoelectric pressure sensors 25 can be calculated by the control system 35, to provide a single reading. In alternative embodiments, the median reading of the pressure sensors 25 can be calculated by the control system 35, to provide a single reading. In either scenario, the methodology can protect against false actuation due to shock or vibration on a single piezoelectric pressure sensor. Thus, in operation, the calculated readings from all instances of the piezoelectric pressure sensors 25 can be used to eliminate any abnormal reading due to shock or vibration. This reading can then be used to alert the user that the filter 30 requires attention. For example, as pressure on the filter increases, due to blockage, the average readings of the piezoelectric pressure sensors 25 can be used to determine whether attention to the filter is needed, e.g., cleaning and/or replacement. By example, when the force exceeds a certain threshold, an alert can be provided to the user.

In embodiments, the control system 35 can include one or more visual and/or auditory alert systems. For example, the control system 35 can provide a color coded scheme, to identify issues with the filter 30. As an illustrative example, as the force measured by the piezoelectric pressure sensors 25 increases, the control system 35 provides different feedback to the user from, e.g., a green to a yellow to a red visual signal. In this example, green would indicate that the filter is in proper working order, e.g., is not clogged, whereas, yellow would indicate that attention may be required and red would indicate that the filter needs immediate attention, e.g., cleaning or replacement. As another example, an alarm can be sounded when the filter requires attention. In any scenario, the control system 35 can provide appropriate feedback to the user. In embodiments, the control system 35 can be a mobile device, for example, which can receive the sensor readings wirelessly and/or provide the processes herein.

In further embodiments, the control system 35 can provide a mechanism for user adjustments or calibrations. As an example, calibrations can be provided based on the size of the filter, size of the unit, e.g., vacuum power, size of the air duct and/or Minimum Efficiency Reporting Value (MERV) of the filter. Illustratively, the control system 35 can be adjusted so that different forces (pressures) provided on the filter, would provide different feedbacks using the above calibrated points. Thus, depending on the filter, type of system, etc. the control system 35 can adjust the system to provide the appropriate level of response needed by the user to correct any issues with the filter (in any system).

Figure 2:
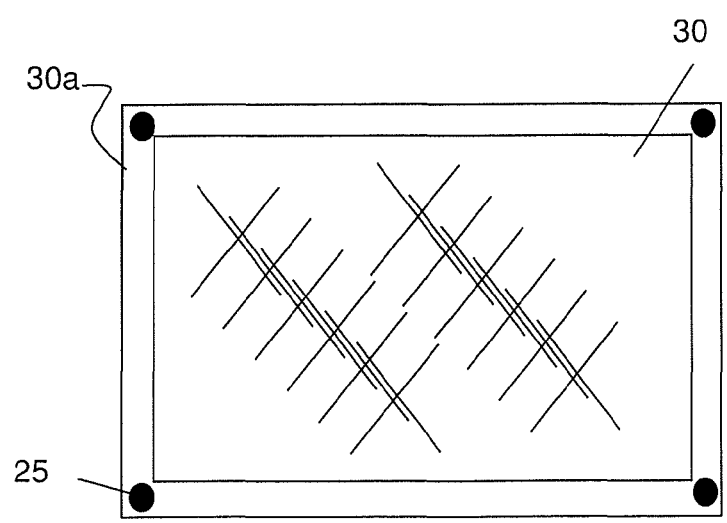
FIG. 2 shows an alternative embodiment of the filter system in accordance with aspects of the present invention.

FIG. 2 shows an alternative embodiment in accordance with aspects of the present invention. In this alternative embodiment, the piezoelectric pressure sensors 25 can be provided directly on a frame 30a of the filter 30. In this way, the filter 30 can include the appropriately calibrated piezoelectric pressure sensors 25 based on the size of the filter, its use, and/or MERV of the filter.

Figure 3:
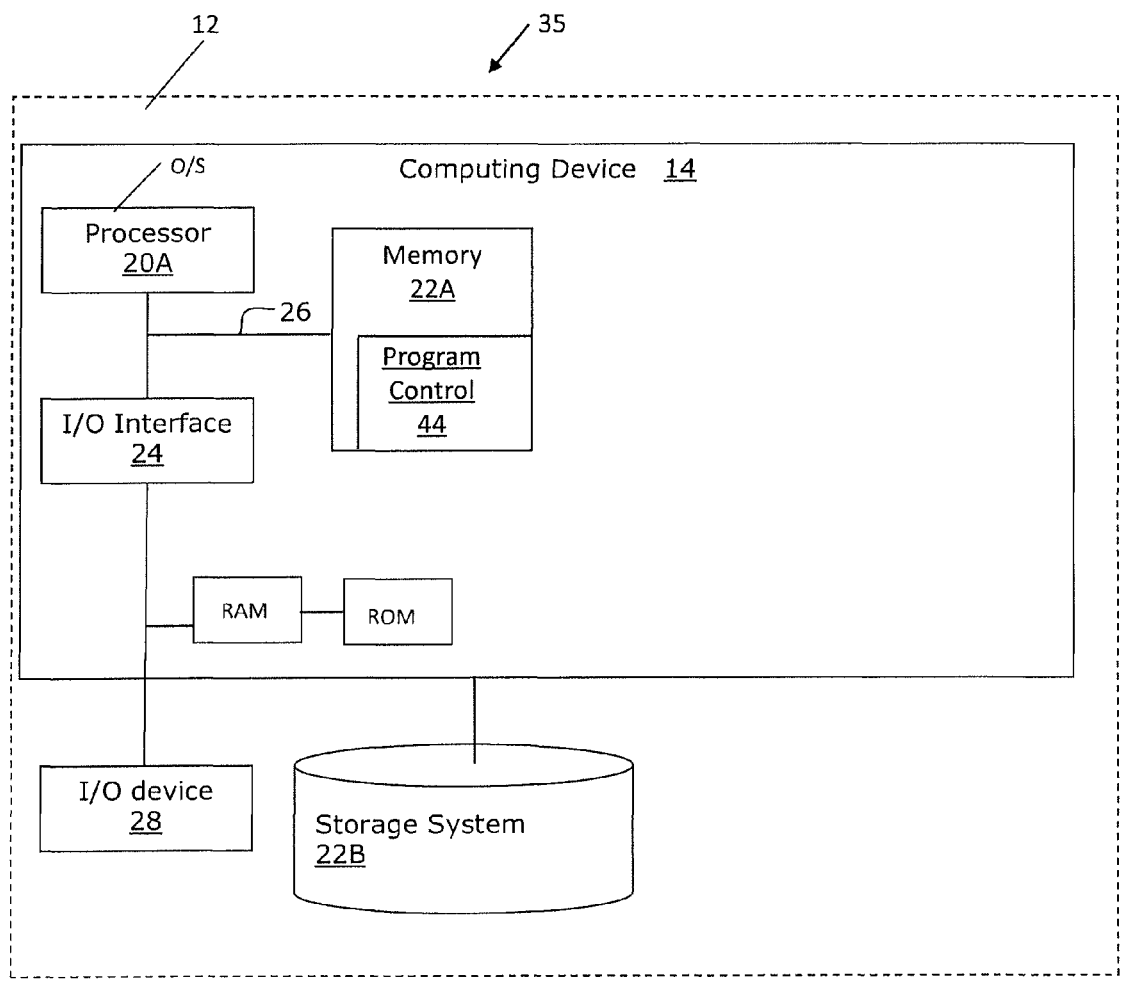
FIG. 3 shows a control system in accordance with aspects of the present invention.

FIG. 3 shows the control system in accordance with aspects of the present invention. As will be appreciated by one skilled in the art, aspects of the present invention may be embodied as a system, method or computer program product. Accordingly, aspects of the present invention may take the form of an entirely hardware embodiment, or a combination of hardware and software. Furthermore, aspects of the present invention may take the form of a computer program product embodied in one or more computer readable storage medium having computer readable program code embodied thereon for execution of the processes herein. The computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The computer program code for carrying out operations for aspects of the present invention may be written in any combination of one or more programming languages. The program code may execute entirely on the control system 35. In embodiments, the control system, 35 can be a remote computer connected to a user's computer or other computing system through any type of network, including a local area network (LAN) or a wide area network (WAN), or the connection may be made to an external computer (for example, through the Internet using an Internet Service Provider). These computer program instructions may also be stored in a computer readable storage medium.

In embodiments, FIG. 1 shows the control system 35 for managing the processes in accordance with the invention. As should be understood, the control system 35 can be a stand-alone computing system or a mobile device, which can connect to the one or more sensors, wirelessly or wired. In a wireless implementation, the control system 35 can be connected by any communication protocol, including through SMS, TCP/IP, LAN, WAN, etc. To this extent, the control system 35 can be any computing system 12 or combinations thereof that can perform the processes described herein. In particular, the computing system 12 includes a computing device 14. The computing device 14 can be resident on a network infrastructure or computing device of a third party service provider (any of which is generally represented in FIG. 1). The computing device 14 includes a processor 20A, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a visual and/or audio display, as well as a keyboard in order to calibrate the system or provide other user inputs. The storage system 22B can store the threshold values, initial pressure values, as well as the logic required to compare the threshold values to the current measurements of the pressure sensors.

In general, the processor 20A executes computer program code (e.g., program control 44), which can be stored in the memory 22A and/or storage system 22B. In accordance with aspects of the invention, the program control 44 provides the processes described herein. For example, the program control 44 can compare the threshold values to the current measurements of the pressure sensors, and provide an alarm, notification, etc. to the user when the threshold values are exceeded (which is indicative of a certain condition of the filter (e.g., blockage of the filter). The program control 44 can also notify the user when the measured values are nearing the threshold values. In further embodiments, the program control 44 can determine the type of system (or be programmed to know the type of system), the appropriate threshold values used for such system, and make the appropriate comparisons and notifications based on the appropriate filter use and user programmed criteria for such a system. For example, as noted above, the threshold values can be changed to any level as needed in response to a system requirement.

In embodiments, the threshold value is correlated with a known force applied by the filter on the support member, which is indicative of a condition (e.g., blockage) of the filter. In embodiments, the present invention contemplates the use of several values, which are correlated with conditions of the filter. By way of example, a first value (force) can be correlated with a non-restricted filter (e.g., clean), a second value (force) can be correlated with a partially restricted filter (e.g., partially blocked) and a third value (threshold value) can be correlated with a restricted filter (e.g., blocked). Of course, other values can also be used with the present invention, in order to correlate with different conditions of the filter, different filter arrangements, different types of applications, etc. In any of these scenarios, the pressure values will be correlated with a certain condition of the filter such that, in embodiments, the control system 35 can make such a comparison between the reading of the pressure sensor and the set values to determine the filter condition.

The program control 44 can be implemented as one or more program code stored in memory 22A as separate or combined modules. Additionally, the program control 44 may be implemented as separate dedicated processors or a single or several processors to provide the function of these tools. While executing the computer program code, the processor 20A can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

In embodiments, a service provider could offer to perform the processes described herein. In this case, the service provider can create, maintain, deploy, support, etc., the computer infrastructure that performs the process steps of the invention for one or more customers. These customers may be, for example, any business that has physical facilities requiring any type of filtration. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system, comprising:
    at least one pressure sensor which monitors a force applied by a filter on a filter housing, wherein the at least one pressure sensor and the filter are supported by the filter housing and the least one pressure sensor is provided between the filter and the filter housing; and
    a control system which provides notification to a user when the force measured by the at least one pressure sensor exceeds a predetermined threshold value.

2. The system of claim 1, wherein the at least one pressure sensor is mounted to the filter housing.

3. The system of claim 1, wherein the at least one pressure sensor is mounted to the filter.

4. The system of claim 1, wherein the at least one pressure sensor senses an increased force applied by the filter on the filter housing, as the filter becomes blocked.

5. The system of claim 1, wherein the filter housing is a frame of an air duct, and the at least one pressure sensor is a piezoelectric dynamic force sensor.

6. The system of claim 1, wherein the notification by the control system is one of a visual indicator and an auditory signal.

7. The system of claim 1, wherein the at least one pressure sensor is at least two pressure sensors which sense the force applied by the filter on the filter housing at different locations, and the control system provides a calculated reading of the at least two pressure sensors.

8. The system of claim 7, wherein the control system is configured to protect against a false reading from a single pressure sensor.

9. The system of claim 7, wherein the calculated reading is one of an average reading and a median reading of the at least two pressure sensors.

10. The system of claim 1, wherein the predetermined threshold value is correlated with a condition of the filter, using the control system.

11. The system of claim 10, wherein the condition is a blocked filter.

12. A system, comprising:
    at least two piezoelectric pressure sensors mounted between a filter and a filter housing, the at least two piezoelectric pressure sensors sense an increased force applied by the filter on the filter housing during use, wherein the filter housing supports the at least two piezoelectric pressure sensors and the filter, and the at least two piezoelectric pressure sensors are provided between the filter housing and the filter; and
    a control system connected to the at least two piezoelectric pressure sensors, the control system:
        determining a calculated reading of the at least two piezoelectric pressure sensors;
        correlating the calculated reading to a predetermined value, and
        providing a notification to a user when the correlated calculated reading is above the predetermined value.

13. The system of claim 12, wherein the calculated reading is an average reading of the at least two piezoelectric pressure sensors.

14. The system of claim 12, wherein the calculated reading is a median reading of the at least two piezoelectric pressure sensors.

15. The system of claim 12, wherein the notification provided by the control system is a visual notification or an auditory signal.

16. The system of claim 12, wherein the control system is configured to be calibrated based on at least one of a type of filter and a type of filtering system.

17. The system of claim 12, wherein the predetermined value is correlated with a condition of the filter.

18. The system of claim 12, wherein the predetermined value is multiple values correlated with different conditions of the filter.

19. The system of claim 12, wherein the predetermined value is indicative of a blocked filter.

20. A method of measuring a condition of a filter, comprising:
    measuring a force applied by a filter on a filter housing by at least one pressure sensor, wherein the filter housing supports the at least one pressure sensor and the filter, and the at least one pressure sensor is provided between the filter and the filter housing;
    correlating the measured force with a condition of a filter; and
    providing a notification to a user that the condition of the filter includes a blockage, when the measured force is above a threshold value.

21. The method of claim 20, wherein the correlating comprises comparing the measured force with a known initial force.

* * * * *